United States Patent [19]
Wada et al.

[11] 4,412,229
[45] Oct. 25, 1983

[54] LINE RECORDING METHOD

[75] Inventors: Minoru Wada; Satoshi Yoshida, both of Asaka, Japan

[73] Assignee: Fuji Photo Film Co., Ltd., Saitama, Japan

[21] Appl. No.: 292,518

[22] Filed: Aug. 13, 1981

[30] Foreign Application Priority Data

Aug. 19, 1980 [JP] Japan ................................ 55/113764

[51] Int. Cl.³ ........................ G01D 9/42; G01D 15/10
[52] U.S. Cl. .................................... 346/108; 346/76 L
[58] Field of Search .............................. 346/76 L, 108

[56] References Cited

U.S. PATENT DOCUMENTS

| 4,037,231 | 7/1977 | Broyles et al. | 346/108 |
| 4,152,726 | 5/1979 | Kojima et al. | 346/76 L X |
| 4,213,158 | 7/1980 | DeBenedictis | 346/108 X |
| 4,319,285 | 3/1982 | Minerd | 346/76 L X |
| 4,350,988 | 9/1982 | Masegi | 346/108 |

Primary Examiner—George H. Miller, Jr.
Attorney, Agent, or Firm—Eyre, Mann, Lucas & Just

[57] ABSTRACT

In recording a line image on a heat mode recording medium, the intensity of the light spot is regulated in proportion to the square root of its velocity to obtain a line image of constant width.

1 Claim, 2 Drawing Figures

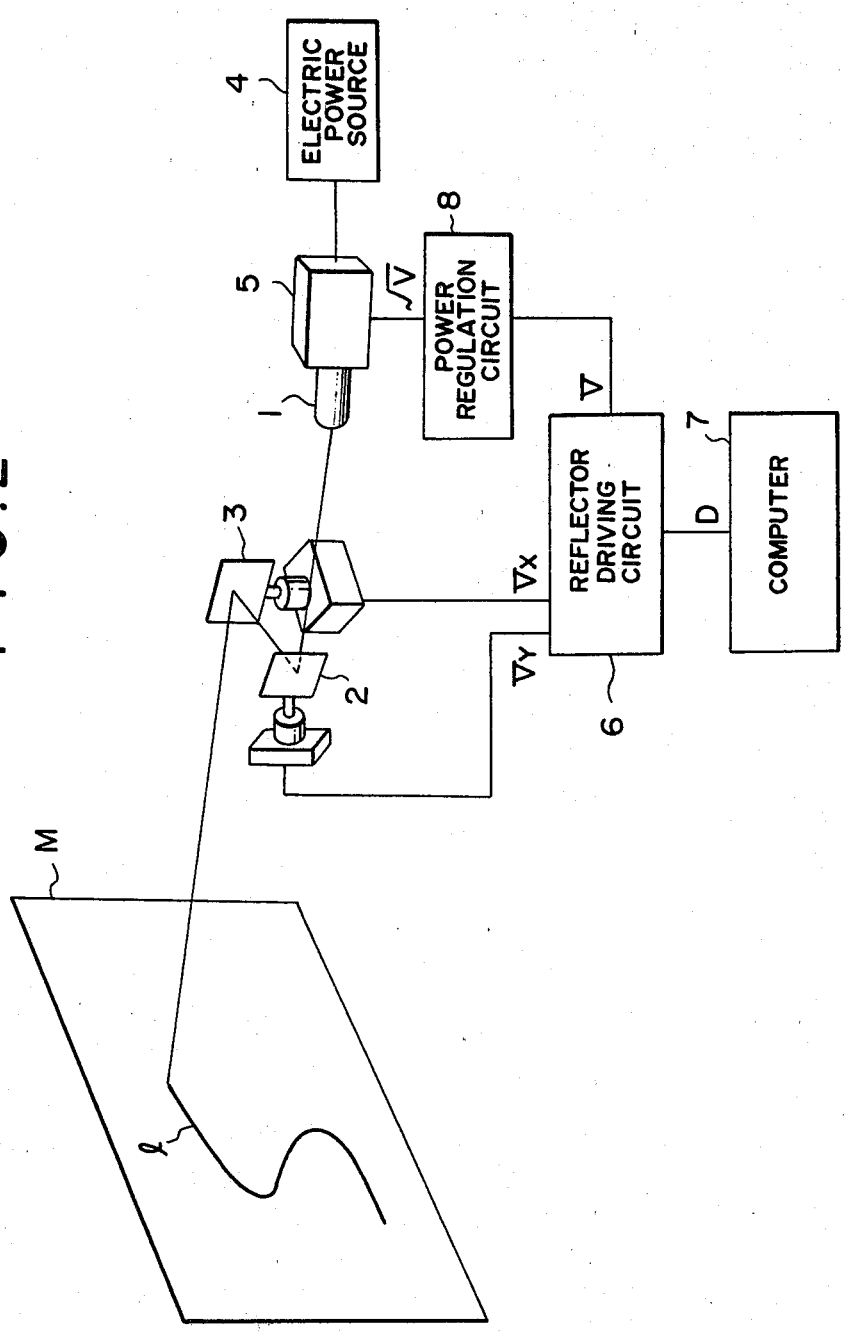

LINE RECORDING METHOD

BACKGROUND OF THE INVENTION

1. Field of the Invention

This invention relates to a recording method for recording the locus of a light spot on a heat-mode recording medium.

2. Description of the Prior Art

This type of recording method is used, for instance, in recording the locus of a flying object. To cite a specific example, a laser light spot or the like used to represent a flying object is made to move over a heat-mode recording medium in a path corresponding to the course of the flying object, thereby to record the locus of the flying object on the recording medium.

By a heat-mode recording medium is meant a recording medium whereon information is recorded as a change in the optical characteristics of the medium within the regions of the recording layer thereof thermally modified such as by fusion, evaporation or condensation when a beam of light with high energy density such as a laser beam is directed thereon, the thermal modification of the recording layer being caused primarily by the heat of the beam with high energy density. The heat-mode recording medium used in this invention may be one of those disclosed in Japanese Unexamined Patent Publication Nos. 78236/1976, 20821/1977 or 83617/1978 but is not limited to these and may be of any type whatever.

Heat-mode recording mediums are advantageous in that they do not have to be developed and that the recording operation can be carried out in a light room or under a bright safety light. As a result, they are being used more and more widely in place of photosensitive materials employing silver salts. However, when a heat-mode recording medium is used to record the locus of a flying object which moves at varying speeds, there arises the drawback that the line image recorded on the medium to represent the locus of the flying object will not be of uniform thickness. For example, assume that the recording operation is carried out using a laser beam directed onto the recording layer of the medium so as to cause certain regions of the layer to fuse and, through this fusion, become transparent to light. Now, if the speed of the flying object varies, this will cause a corresponding variation in the exposure time of the recording layer along the path of the laser beam thereon. Therefore, since the laser beam is of constant intensity, the thickness of the line image representing the locus of the flying object will vary in accordance with the variation in the speed of the flying object.

SUMMARY OF THE INVENTION

The object of the present invention is to provide a recording method capable of recording a line of constant thickness regardless of any variation in the speed at which the light spot used for recording passes over the recording medium.

The recording method of the present invention is characterized in that the power of the light source for producing the light spot is varied to be approximately proportional to the square root of the velocity of the light spot on the recording medium.

The present inventors carried out the following experiment in order to determine the relationship that has to be maintained between the speed of a light spot (beam scanning velocity) and the power of the laser beam source for producing the light spot in order to produce a line of constant thickness on a heat-mode recording medium.

The experiment consisted of measuring the power of a laser beam source required for producing a line with a width of $12\mu$ at scanning velocities of 18.8 m/s, 9.9 m/s, 0.8 m/s, 0.08 m/s and 0.008 m/s. The heat-mode recording medium used in the experiment was fabricated by coating a $100\mu$ thick film of polyethylene terephthalate with a layer chlorinated polyethylene, co-evaporation depositing on this layer quantities of Sn and SnS equivalent to a thickness of 600 A of the former and 300 A of the latter to produce a recording layer consisting of physically combined Sn and SnS, providing a layer of a copolymer of ethylene and vinyl acetate over the recording layer and then providing a layer of a copolymer of vinyl chloride and vinyl acetate over this last said layer. The diameter of the laser beam was $24\mu$. The results of this experiment were as shown in Table 1 below.

TABLE 1

| Beam scanning velocity | Power of the laser source for producing $12\mu$ line |
|---|---|
| 18.8 m/s | 320 mw |
| 9.9 m/s | 220 mw |
| 0.8 m/s | 75 mw |
| 0.08 m/s | 20 mw |
| 0.008 m/s | 10 mw (fogging) |

From the results of the experiment, the inventors discovered that when the recorded line is maintained at a constant width, the power of the laser beam source is approximately proportional to the square root of the beam scanning velocity. The present invention was perfected on the basis of this discovery.

In the recording method according to the present invention, the power of the laser beam source is automatically varied in accordance with the variation in the scanning velocity so as to continuously produce a recorded line which is of constant width and therefore easy to read.

BRIEF DESCRIPTION OF THE DRAWINGS

FIG. 2 is a schematic view of one example of a device for carrying out the recording method of the present invention.

DETAILED DESCRIPTION OF THE INVENTION

Figure 1:
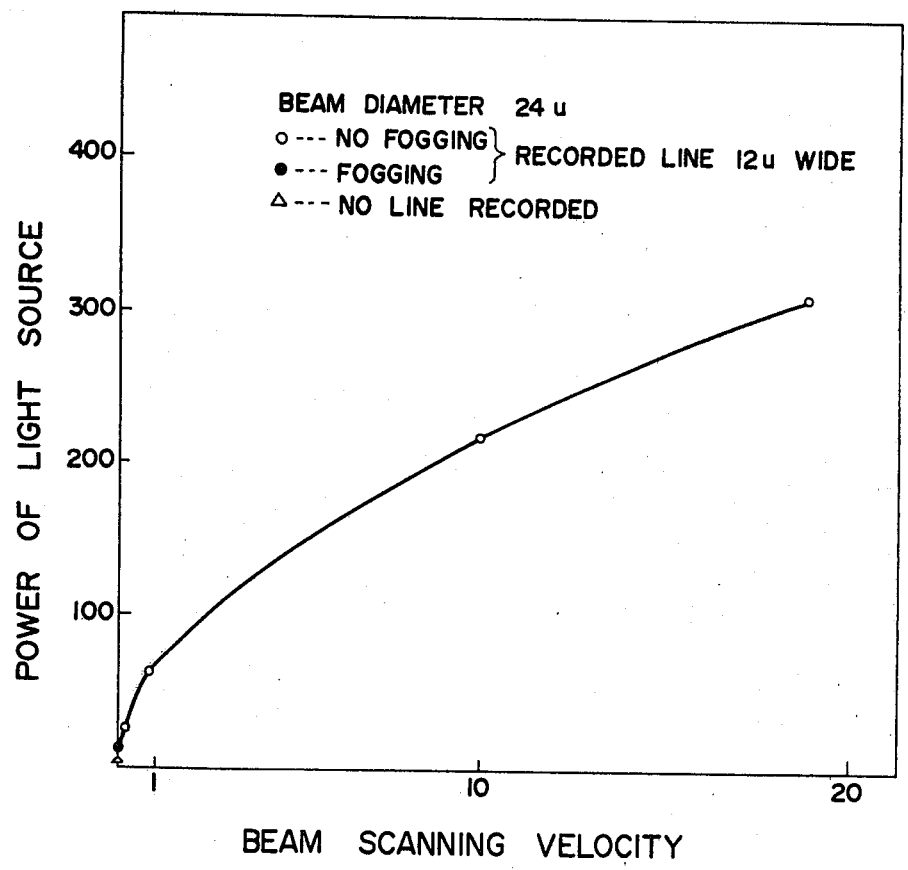
FIG. 1 is a graph showing the relationship between the beam scanning velocity and the power of the light source when the width of the recorded line is maintained constantly at $12\mu$.

Referring first to FIG. 2, a laser beam from a laser beam source 1 is deflected in the vertical direction (along the Y axis) by a vertical deflector 2 and in the horizontal direction (along the X axis) by a horizontal deflector 3. By appropriately controlling the vertical and horizontal deflectors 2 and 3, the light spot produced on the recording medium M by the laser beam can be freely moved in directions resulting from the combination of movements in the X and Y directions and can, for example, be made to move to correspond to the movement of a flying object so as to record the locus described thereby.

The laser source 1 is driven by a light source driving circuit 5 connected to an electric power source 4, thereby to emit a laser beam.

The vertical and horizontal deflectors 2 and 3 consist, for example, of galvanometer mirrors and are respectively connected to a deflector driving circuit 6. The deflector driving circuit 6 is connected to a computer 7 storing data D for controlling the deflectors (for example, data on the speed, direction and other aspects of the flight of a flying object). On the basis of the data D received from the computer 7, the deflector driving circuit 6 produces a horizontal deflection signal $V_x$ for controlling the horizontal deflector 3, a vertical deflection signal $V_y$ for controlling the vertical deflector 2 and a velocity signal V indicative of the speed of the laser beam spot on the medium M. The horizontal and vertical deflection signals $V_x$ and $V_y$ are inputted to the horizontal and vertical deflectors 3 and 2, respectively. As a result, the horizontal and vertical deflectors 3 and 2 are driven so as to cause the laser beam from the laser source to generate a line image 1 representing the locus of the flying object on recording medium M.

Except for the case where the speed of the flying object is constant, the velocity of the light spot which generates the image line 1 will vary from moment to moment, causing the thickness of the line image 1 to vary accordingly, as was explained earlier.

Therefore, the device for carrying out the method of the present invention is provided with a power regulation circuit 8 connected between the deflector driving circuit 6 and the light source driving circuit 5. The power regulation circuit 8 receives the velocity signal V from the deflector driving circuit 6, calculates the square root of the value of V to obtain $\sqrt{V}$ and regulates the power of the light source driving circuit 5 in proportion to $\sqrt{V}$. Therefore, in the course of recording the locus of the light spot on the recording medium M, the power of the laser beam source 1 is regulated by the power regulation circuit 8 so as to be proportional to the square root ($\sqrt{V}$) of the velocity (V) of the light spot. As a consequence, the thickness of the recorded line image 1 is constant throughout.

It should be noted that where it is desired to eliminate variation in the thickness of the line image 1 even more thoroughly, it is possible to adjust the value of $\sqrt{V}$ by a factor related to the velocity of the light spot.

Also, it is possible control the power of the light source so as to prevent the spot image produced when the light spot comes to a standstill from growing larger and larger due to the wide-area fusion of the recording medium caused by the heat of the laser beam.

By the use of the above described recording method according to the present invention, it is possible to record a line image which is maintained at a constant thickness throughout regardless of variation in the recording velocity on the recording medium.

What is claimed is:

1. A recording method for recording a line image on a heat-mode recording medium comprising the steps of moving a light spot from a light source over the surface of a heat-mode recording medium; determining the velocity of and providing a velocity signal V corresponding to the speed of the light spot on the medium; and simultaneously regulating the power output of the light source so that the intensity is substantially proportional to the square root of the value of V.

* * * * *